United States Patent [19]

Kurtz

[11] 4,106,349

[45] Aug. 15, 1978

[54] TRANSDUCER STRUCTURES FOR HIGH PRESSURE APPLICATION

[75] Inventor: Anthony D. Kurtz, Englewood, N.J.

[73] Assignee: Kulite Semiconductor Products, Inc., Ridgefield, N.J.

[21] Appl. No.: 848,159

[22] Filed: Nov. 3, 1977

[51] Int. Cl.² .............................................. G01L 9/06
[52] U.S. Cl. .................................................... 73/746
[58] Field of Search ........................ 73/727, 754, 746; 338/4, 39, 42

[56] References Cited

U.S. PATENT DOCUMENTS

| 3,417,361 | 12/1968 | Heller et al. | 338/4 |
| 3,505,874 | 4/1970 | Kato et al. | 338/4 |

FOREIGN PATENT DOCUMENTS 1,246,925   9/1971   United Kingdom ..................... 73/754

Primary Examiner—Donald O. Woodiel
Attorney, Agent, or Firm—Arthur L. Plevy

[57] ABSTRACT

A high pressure transducer includes a first disk member having positioned on a surface, a square piezoresistive bridge array. Located above and coaxial with the first disk member is a second member of a substantially greater thickness. The second member has a plurality of apertures in alignment with the terminal areas contained within said bridge pattern. The apertures accommodate leads which are directed from the bridge pattern on the first disk to utilization means for monitoring transverse variations in the bridge when operating in a high pressure environment.

10 Claims, 2 Drawing Figures

TRANSDUCER STRUCTURES FOR HIGH PRESSURE APPLICATION

BACKGROUND OF INVENTION

The piezoresistive transducer has been widely employed in the measurement of pressure in various types of environments and application. Most semiconductor strain gage transducers employed in the prior art have used the longitudinal piezoresistive effect.

Generally speaking, a great majority of pressure transducers employ a relatively thin diaphragm which may be fabricated from a semiconductor material such as silicon. This diaphragm has deposited or diffused thereon, a piezoresistive strain gage configuration such as a bridge circuit wherein the resistors associated with the bridge exhibit a change in resistance according to the deflection of the diaphragm. Accordingly, one can then monitor the bridge circuit to obtain an electrical current indicative of the applied pressure or force. Hence, the prior art is replete with a great number of patents and literature directed towards such embodiments.

In any event, it becomes extremely difficult to employ the longitudinal piezoresistive effect in the measurement of extremely high pressures or pressures in excess of 25,000 psi. The prior art has been cognizant of the transverse or shear piezoresistive effect and many articles and publications exist which essentially describe the theory of operation of the same. For example, see an article entitled MONOGRAPH 4056 by the Bell Telephone System publication entitled SEMICONDUCTING STRESS TRANSDUCERS USING TRANSVERSE AND SHEAR PIEZORESISTANCE by W. G. Pfann and R. N. Thurston.

As indicated in the above noted article and others, there have been transducers fabricated which make use of both the transverse and longitudinal piezoresistive coefficients. In a transverse situation, the tensile or compressive stress is normal to the current flow through the sensors as compared to the longitudinal situation, where the tensile and compressive stress are in the same direction as the current flow through the sensors. Hence, by optimum design, one can faithfully transmit transverse and shear strains to semiconductor sensor devices.

In any event, the use of a conventional type of diaphragm in such situations is, as indicated, extremely difficult as the diaphragm does not behave according to the constraints determined by low pressure measurements. The prior art has attempted to formulate a high pressure transducer employing the transverse effect by using a thin disk of silicon with suitable sensors positioned between two compression members. Such techniques, however, are inherent with other problems such as thermal stability and in general, temperature fluctuations. As one can ascertain, a high pressure environment can be associated with high temperature and hence, the nature of the operating environment imposes severe restrictions on the type of device used.

Apart from the above noted considerations, there is a further problem in directing leads from the transducer structure to enable the monitoring of the bridge characteristics in that environment.

It is therefore an object of the present invention to describe a high pressure transducer structure which is particularly adapted for the measurement of pressures in excess of 25,000 psi while providing thermal stability employing the transverse piezoresistive effect.

BRIEF DESCRIPTION OF PREFERRED EMBODIMENT

A pressure transducer particularly adapted for high pressure measurements, comprising a first disk of a predetermined thickness having located on a surface thereof, a piezoresistive sensor element having at least one terminal associated therewith, a second disk of a substantially greater thickness than said first disk and of a relatively congruent surface configuration, said second disk having at least one aperture directed from a first to a second surface, and means positioning said first and second disks in contact with each other, with the surface of said first disk as containing said sensor, in contact with a surface of said second disk containing said aperture, with said aperture overlying said terminal and a lead directed through said aperture and in contact with said terminal.

DETAILED DESCRIPTION OF FIGURES

Figure 1:
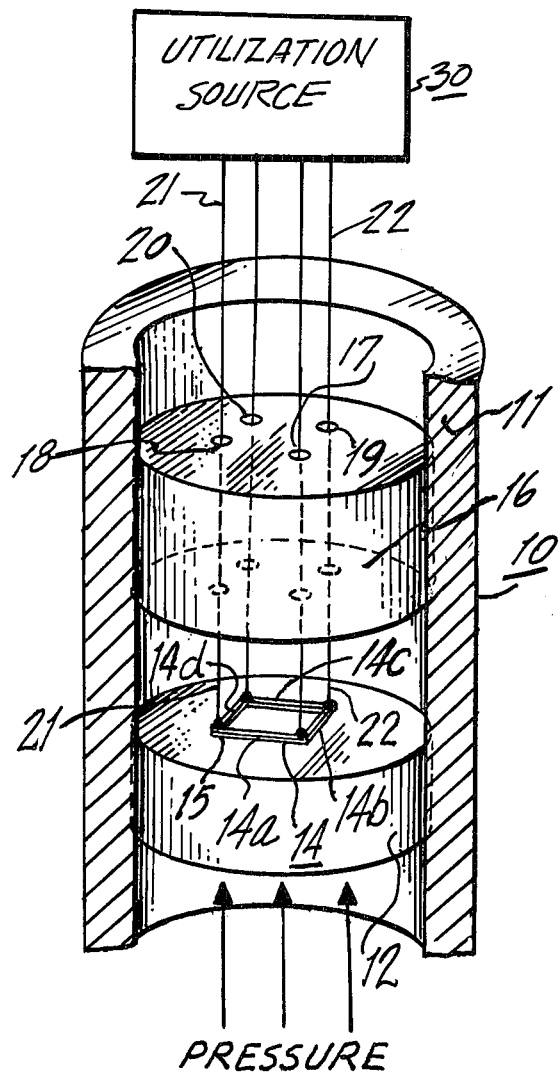
FIG. 1 is a perspective view partially in cross-section depicting a high pressure transducer according to this invention.

Referring to FIG. 1, there is shown a high pressure transducer 10 according to the principles of this invention. Essentially, and as will be explained, the figure depicts a high temperature transducer in an assembly view in order to more clearly understand the operation of the device.

There is shown a cylindrical housing 11 which is used to contain the transducer assembly. Housing 11 may be fabricated from a suitable metal such as Kovar or a high temperature steel alloy.

Before proceeding further, it is noted that the transducers depicted employ cylindrical members of circular cross-section, but it is understood that any other type of geometrical arrangement could be provided as well, such as rectangular or square housings and components.

Located within the housing 11 is a first solid cylindrical member 12 which may be fabricated from a suitable semiconductor such as silicon and so on. The cylindrical member 12 is relatively thick as compared to the typical thickness of a diaphragm and may, for example, be between 0.004" and upwards for measurements of pressures above 25,000 psi.

Located on the surface of the diaphragm 12 is a square or rectangular bridge pattern 14. As seen, the bridge pattern contains four arms as 14a to 14d. Each arm is a piezoresistive semiconductor sensor and the sensors are thus arranged and connected in a bridge configuration. The techniques of forming such configurations on a pressure member as 12 are well known in the art and many examples of simple techniques for doing so have been described in the literature. See, for example, Application Note KPS-AN10 entitled SEMICONDUCTOR TRANSDUCERS USING TRANSVERSE AND SHEAR PIEZORESISTANCE by Anthony D. Kurtz and Charles L. Gravel published by Kulite Semiconductor Products, Inc., the assignee herein.

Generally speaking, in a high pressure application, one can only employ the transverse piezoresistive effect. Essentially, two of the sensors shown in the bridge configuration such as 14b and 14d in opposite arms are oriented with respect to the crystallographic axis of the material from which the sensors were formed so that they are only disposed to exhibit the transverse effect.

The orientation of such sensors with regard to the crystallographic axis to obtain optimum operation in the transverse mode is described in the above noted paper.

The other two resistors such as 14a and 14c are piezoresistive devices but exhibit a minimum longitudinal or transverse piezoresistive effect and in essence, are included to complete the bridge configuration, but do not vary their resistance in any appreciable manner according to applied pressure. Hence, resistors in two opposite arms as 14b and 14d are active devices and are disposed to exhibit the transverse piezoresistive effect while resistors as 14a and 14c in opposite arms complete the bridge configuration and do not exhibit any appreciable piezoresistive effect.

Accordingly, the bridge configuration shown is sometimes referred to as a one-half active bridge based on the fact that two of the sensors are active and vary according to applied pressure.

The bridge pattern essentially provides four output terminals at 15; each one associated with a corner of the rectangular or square array 14.

Shown directly above the base member 12 is a second cylinder 16. The cylinder 16 is fabricated from the same material as cylinder 12 and may, for example, also be fabricated from a semiconductor material such as silicon.

In any event, the cylindrical member 16 is substantially thicker than the member 12 and may, for example, be five or ten times the thickness of the same.

Located in cylinder 16 are four apertures as 17-20. Each aperture is positioned so that it is directly in line with a respective terminal area as 15 associated with the array 14. Wires or leads as 21 and 22 are directed through these apertures to a utilization source 30 which may, for example, include a biasing means for the bridge circuit as well as a meter or other device to monitor the change in resistance according to pressure.

Figure 2:
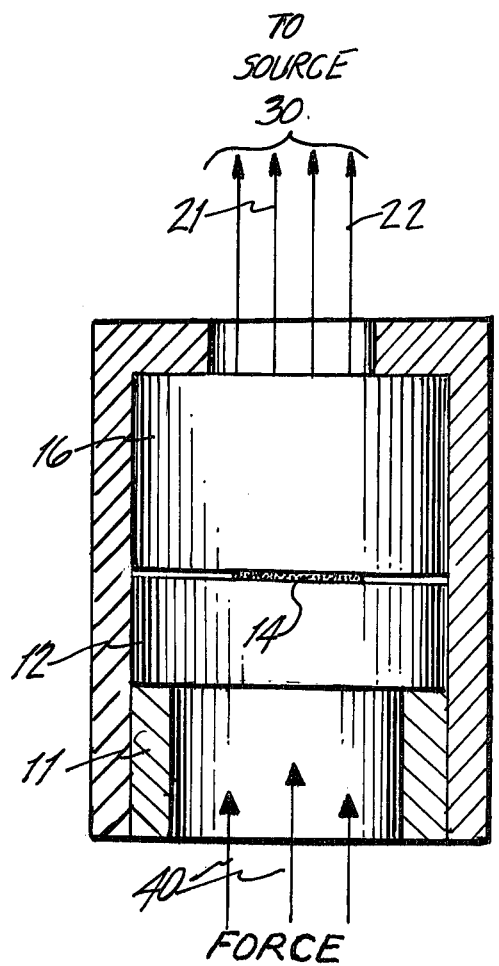
FIG. 2 is a side view partially in cross-section depicting the transducer assembly of FIG. 1.

Referring to FIG. 2, there is shown a side cross-sectional view of the apparatus depicted above. Essentially, a force or pressure is applied to the composite structure in the direction of the arrow 40. The housing 11 as well as the relative thickness of members 12 and 16 assure that the force exerted on the structure is mainly compressive.

As above indicated, due to the constraints imposed by the piezoresistors as 14b and 14d, these sensors respond mainly according to the transverse piezoresistive effect and hence, vary resistance according to the applied pressure. It is, of course, seen that due to the constraints imposed by the disks 12 and 16 as positioned in housing 11, that the members are subjected to high compressive force based on large applied pressure.

Due to the fact that the member 16 is much thicker than member 12, it acts as a heat sink and hence, will serve to uniformly distribute the temperature throughout.

It is, of course, noted that members 12 and 16 are in intimate contact as shown in FIG. 2 and held in such contact by the housing 11. The apertures 17-20 in member 16 assure that the output leads as 21 and 22 are completely isolated. In this manner, the unit has excellent thermal stability, as both the disk 12 and the associated sensors as well as the backup disk 16 are fabricated from the same material.

The disk 12 is relatively thick as compared to a typical diaphragm and hence, is an excellent transmitter of compressive or tensile forces. The disk 16 enables the further application of extremely high pressures to the structure based on its thickness, while further providing lead apertures to enable one to monitor the resistance changes in the bridge array of applied pressure. The thickness of member 16 as compared to member 12 assures reliable thermal operation of the entire assembly; thus providing for increased efficiency in both high pressure and high temperature measurements.

Thus, the above described transducer has applicability in measuring blast pressure as those pressures which exist due to the ignition of high explosive devices.

It is interesting to note that a high pressure environment is associated with high frequency of operation. The device described above is capable of high frequency operation based on the use of transverse piezoresistive effect employed.

I claim:

1. A pressure transducer particularly adapted for high pressure measurements, comprising:
   (a) a first disk of a predetermined thickness having located on a surface thereof, a piezoresistive sensor element having at least one terminal associated therewith,
   (b) a second disk of a substantially greater thickness than said first disk and of a relatively congruent surface configuration, said second disk having at least one aperture directed from a first to a second surface, and
   (c) means positioning said first and second disks in contact with each other, with the surface of said first disk as containing said sensor, in contact with a surface of said second disk containing said aperture, with said aperture overlying said terminal and, a lead directed through said aperture and in contact with said terminal.

2. The pressure transducer according to claim 1 wherein said sensor element is a square array of piezoresistive devices, each arm of said square including a separate piezoresistive sensor, with each corner of said square defining a separate terminal location for said array.

3. The pressure transducer according to claim 2 wherein said second disk has four apertures directed from a first to a second surface with each aperture located according to said corners of said square defining said array.

4. The pressure transducer according to claim 1 wherein said second disk is between 4 to 10 times thicker than said first disk.

5. The pressure transducer according to claim 1 wherein said first and second disks are fabricated from silicon.

6. The pressure transducer according to claim 1 wherein the thickness of said first disk is selected for pressure measurements above 25,000 psi.

7. The pressure transducer according to claim 1 wherein said first and second disks are circular and of the same diameter.

8. The pressure transducer according to claim 1 wherein said means for positioning said first and second disks includes a longitudinal tubular housing of an inner diameter relatively equal to the diameter of first and second disks for supporting the same.

9. The pressure transducer according to claim 8 wherein said housing is fabricated from Kovar.

10. The pressure transducer according to claim 1 wherein said sensor is selected to respond to the transverse piezoresistive effect.

* * * * *